United States Patent
Hanbaly et al.

(10) Patent No.: US 11,665,608 B2
(45) Date of Patent: May 30, 2023

(54) SYSTEMS AND METHODS FOR INTERFERENCE MITIGATION FOR NON-MEMBER USER EQUIPMENT DEVICES IN THE VICINITY OF CLOSED ACCESS SMALL CELLS

(71) Applicant: Verizon Patent and Licensing Inc., Basking Ridge, NJ (US)

(72) Inventors: Said Hanbaly, Prosper, TX (US); Amir Saghir, Frisco, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 17/377,150

(22) Filed: Jul. 15, 2021

(65) Prior Publication Data

US 2023/0014207 A1   Jan. 19, 2023

(51) Int. Cl.
*H04W 4/00* (2018.01)
*H04W 36/20* (2009.01)
*H04W 36/00* (2009.01)
*H04W 36/08* (2009.01)

(52) U.S. Cl.
CPC ....... *H04W 36/20* (2013.01); *H04W 36/0058* (2018.08); *H04W 36/00835* (2018.08); *H04W 36/00837* (2018.08); *H04W 36/08* (2013.01)

(58) Field of Classification Search
CPC ......... H04W 36/0058; H04W 36/0061; H04W 36/0083; H04W 36/00835; H04W 36/00837; H04W 36/0085; H04W 36/0088; H04W 36/08; H04W 36/16; H04W 36/165; H04W 36/20
See application file for complete search history.

(56) References Cited

U.S. PATENT DOCUMENTS

2015/0208411 A1* 7/2015 Mochizuki ........ H04W 72/1263
                                                    455/452.1
2019/0274066 A1* 9/2019 Lai ........................ H04W 36/22

OTHER PUBLICATIONS

Technical Specification: ETSI TS 136 300 V16.4.0 (Jan. 2021). LTE; Evolved Universal Terrestrial Radio Access (E-UTRA) and Evolved Universal Terrestrial Radio Access Network (E-UTRAN); Overall description; Stage 2 (3GPP TS 36.300 version 16.4.0 Release 16). 403 pages.

* cited by examiner

*Primary Examiner* — Matthew W Genack (57) ABSTRACT

A device may include a processor configured to determine that a user equipment (UE) device, attached to a base station, is within a coverage area of a small cell operating on a first channel, and that the UE device is not a member of the small cell and is experiencing interference on the first channel. The processor may be further configured to send an instruction to the UE device to provide a measurement report for base stations operating on another band or channel different from the first channel; receive a measurement report from the UE device identifying one or more neighboring base stations operating on the other band or channel; and perform a handover of the UE device to a neighboring base station, wherein the UE device is to communicate with the neighboring base station using the other band or channel.

20 Claims, 7 Drawing Sheets

SYSTEMS AND METHODS FOR INTERFERENCE MITIGATION FOR NON-MEMBER USER EQUIPMENT DEVICES IN THE VICINITY OF CLOSED ACCESS SMALL CELLS

BACKGROUND INFORMATION

To satisfy the needs and demands of users of mobile communication devices, providers of wireless communication services continue to improve and expand available services as well as networks used to deliver such services. One aspect of such improvements includes enabling mobile communication devices to access and use various services via the provider's communication network. For example, the communication network may provide different ways to connect to the network for a large number of diverse devices under various conditions. Managing different types of connections for a large number of different services under different conditions poses various challenges.

DETAILED DESCRIPTION OF EMBODIMENTS

The following detailed description refers to the accompanying drawings. The same reference numbers in different drawings identify the same or similar elements.

As communication networks and services increase in size, complexity, and number of users, management of the communication networks has become more complex. For example, wireless communication networks are incorporating various aspects of next generation networks, such as 5$^{th}$ generation (5G) mobile networks, utilizing high frequency bands (e.g., 24 Gigahertz, 39 GHz, etc.), and/or lower frequency bands such as Sub 6 GHz, and a large number of antennas. 5G New Radio (NR) radio access technology (RAT) may provide significant improvements in bandwidth and/or latency over other wireless network technologies. Additionally, a 5G core network supports and manages 5G radio access networks (RAN) that include base stations, which provide various services and enable connections to other networks (e.g., connections to the Internet, etc.). As an example, a 5G core network may provide support for enhanced Mobile Broadband (eMBB), ultra-reliable low latency communication (URLLC), massive Machine Type Communication (mMTC), and/or other types of communications.

Another aspect of 5G networks is the deployment of small cells, such as, for example, femtocells. A "small cell" may be a small, low-power cellular base station with a smaller coverage radius than a larger base station (which may be referred to as a "macro cell"). A small cell may improve user experience in a particular type of environment that is associated with a large number of users in a small area and/or in an area where macro cell coverage may be inadequate. As an example, a small cell may be deployed in an indoor environment, such as an office building, apartment building, indoor shopping mall, hospital, etc. As another example, a small cell may be deployed at a busy intersection or in an area with weak signal coverage due to multipath fading, such as an area with heavy tree cover or tall buildings.

A small cell may be an open access small cell or a closed access small cell. An open access small cell may be located in a public area and may enable any user equipment (UE) device with an active subscription to use the open access small cell to connect to the network. A closed access small cell may restrict access to UE devices that are members of the closed access small cell. In other words, a closed access small cell may maintain a list of member UE devices and only UE devices included in the list may be authorized to attach to the closed access small cell. As an example, a closed access small cell may be deployed in an apartment building and may restrict access to residents of the apartment building. As another example, a closed access small cell may be deployed in an office building and may restrict access to employees working in the office building.

A non-member UE device may enter the coverage area of a closed access small cell and may not be able to attach to the closed access small cell. The non-member UE device in the vicinity of the closed access small cell may experience interference in the uplink and/or downlink channel, resulting in a bad user experience, such as garbled audio, video pixilation, and/or dropped packets. For example, such interference may happen in particular if the operating carrier of the closed access small cell is the preferred carrier for the non-member UE device. One way to reduce interference is to perform interference mitigation, such as Inter-Cell Interference Coordination (ICIC) which applies restrictions to Radio Resource Management (RRM) blocks across subsets of users impacted by the interference. The ICIC technique may require synchronized coordination between neighboring base stations and reduce the available network bandwidth resources for the affected UE devices, thereby reducing the efficiency of the network and the UE devices.

Implementations described herein relate to systems and methods for interference mitigation, for non-member UE devices in the vicinity of closed access small cells, which do not require the use of ICIC. The systems and methods for interference mitigation described herein determine whether a non-member UE device in the vicinity of a closed access small cell is able to detect another base station operating on a different channel or band and handover the non-member UE device to the other base station to communicate with the other base station using the different channel or band.

A base station, such as a macro cell to which a UE device is attached (e.g., a 5G base station, a Fourth Generation (4G) base station, etc.), may be configured to determine that the UE device is within a coverage area of a closed access small cell, operating on a first channel, that the UE device is not a member of the closed access small cell, and that a level of interference experienced by the UE device on the first channel is higher than an interference threshold. The interference threshold may be a configurable parameter selected by an operator or manager of the provider network. For example, a signal interference threshold may be set to 0 decibel (dB). In response, the base station may send an instruction to the UE device to provide a measurement report for base stations operating on another band or channel different from the first channel. The base station may be further configured to receive a measurement report, from the UE device, which identifies one or more neighboring base stations operating on the other band or channel, and perform a handover of the UE device to one of the identified neighboring base stations, wherein the UE device is to communicate with the at least one neighboring base station using the other band or channel.

The base station may determine the membership status and interference experienced by the UE device based on a measurement report received from the UE device. The measurement report may include an indication of the membership status of the UE device with respect to the closed access small cell. The measurement report may further include one or more key performance indicator (KPI) values indicating a signal strength or quality reported by the UE device, such as, for example, a Reference Signal Received Power (RSRP) value, a Receive Strength Signal Indicator (RSSI) value, a Reference Signal Received Quality (RSRQ) value, a Signal to Noise Ratio (SNR) value, a Signal to Interference Plus Noise Ratio (SINR) value, and/or another type of KPI value that may be used by the base station to determine a level of interference experienced by the UE device.

If the serving base station receives a measurement report from a UE device, attached to the serving base station, that indicates that the UE device is within the coverage area of the closed access small cell, and determines that the UE device is a member of the closed access small cell, the serving base station may perform a handover of the UE device to the closed access small cell.

If the serving base station determines that a UE device did not detect any neighboring base stations operating on another band or channel based on the requested measurement report received from the UE device, or if the serving base station determines that all identified neighboring base stations operating on another band or channel are closed access base stations and the UE device is not a member of any of the detected closed access base stations, the serving base station may maintain the attachment of the UE device and may perform interference mitigation with respect to the UE device and the closed access small cell. For example, the base station may perform ICIC and/or another type of interference mitigation.

Figure 1:
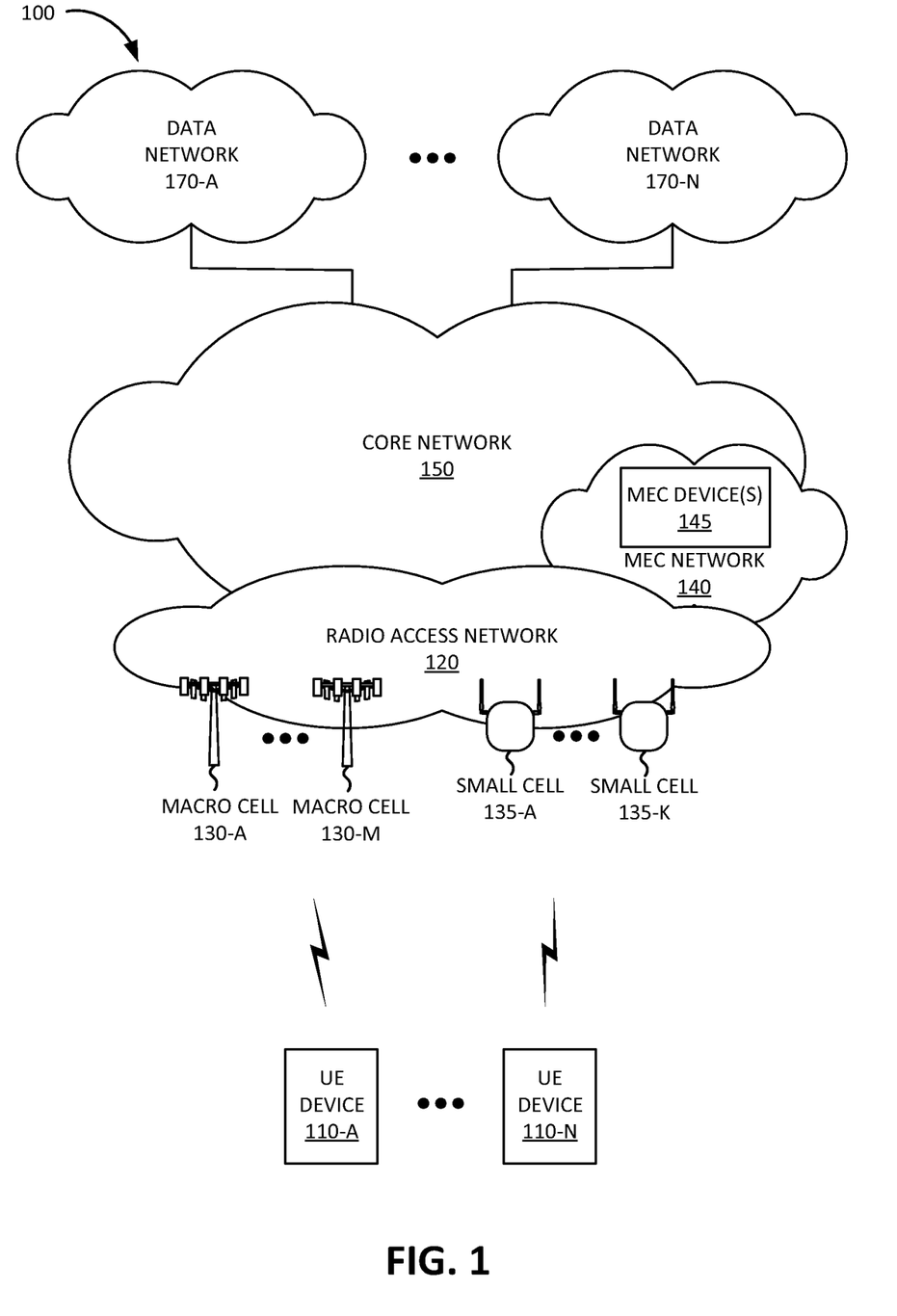
FIG. 1 illustrates an environment according to an implementation described herein.

FIG. 1 is a diagram of an exemplary environment 100 in which the systems and/or methods described herein may be implemented. As shown in FIG. 1, environment 100 may include UE devices 110-A to 110-N (referred to herein collectively as "UE devices 110" and individually as "UE device 110"), a radio access network (RAN) 120 that includes macro cells 130-A to 130-M (referred to herein collectively as "macro cells 130" and individually as "macro cell 130") and small cells 35-A to 135-K (referred to herein collectively as "small cells 135" and individually as "small cell 135"), a MEC network 140 that include MEC device(s) 145, core network 150, and data networks 170-A to 170-N (referred to herein collectively as "data networks 170" and individually as "data network 170").

UE device 110 may include any device with cellular wireless communication functionality. For example, UE device 110 may include a handheld wireless communication device (e.g., a mobile phone, a smart phone, a tablet device, etc.); a wearable computer device (e.g., a head-mounted display computer device, a head-mounted camera device, a wristwatch computer device, etc.); a laptop computer, a tablet computer, or another type of portable computer; a desktop computer; a customer premises equipment (CPE) device, such as a set-top box or a digital media player (e.g., Apple TV, Google Chromecast, Amazon Fire TV, etc.), a WiFi access point, a smart television, etc.; a portable gaming system; a global positioning system (GPS) device; a home appliance device; a home monitoring device; and/or any other type of computer device with wireless communication capabilities and a user interface.

In some implementations, UE device 110 may communicate using machine-to-machine (M2M) communication, such as MTC, and/or another type of M2M communication for Internet of Things (IoT) applications. For example, UE device 110 may include a health monitoring device, an asset tracking device, a traffic management device, a climate controlling device, a device controlling an electronic sign, a device controlling a manufacturing system, a device controlling a security system, a device controlling a power system, a device controlling a financial transaction system, and/or another type of electronic device.

RAN 120 may enable UE devices 110 to connect to core network 150 via base stations such as macro cells 130 and/or small cells 135, using cellular wireless signals. RAN 120 may include, for example, one or more central units (CUs) and distributed units (DUs) (not shown in FIG. 1) that enable and manage connections from macro cells 130 and/or small cells 135 to core network 150. RAN 120 may include features associated with an Long Term Evolution (LTE) Advanced (LTE-A) network and/or a 5G core network or other advanced network, such as management of 5G NR base stations; carrier aggregation; advanced or massive multiple-input and multiple-output (MIMO) configurations (e.g., an 8×8 antenna configuration, a 16×16 antenna configuration, a 256×256 antenna configuration, etc.); cooperative MIMO (CO-MIMO); relay stations; Heterogeneous Networks (HetNets) of overlapping small cells and macrocells; Self-Organizing Network (SON) functionality; Machine Type Communication (MTC) functionality, such as 1.4 Megahertz (MHz) wide enhanced MTC (eMTC) channels (also referred to as category Cat-M1), Low Power Wide Area (LPWA) technology such as Narrow Band (NB) IoT (NB-IoT) technology, and/or other types of MTC technology; and/or other types of LTE-A and/or 5G functionality.

Macro cell 130 and/or small cell 135 may each include a 5G NR base station (e.g., a gNodeB) and/or a 4G LTE base station (e.g., an eNodeB). Macro cell 130 and/or small cell 135 may each include devices and/or components configured to enable cellular wireless communication with UE devices 110. For example, macro cell 130 and/or small cell 135 may each include a radio frequency (RF) transceiver configured to communicate with UE devices using a 5G NR air interface using a 5G NR protocol stack, a 4G LTE air interface using a 4G LTE protocol stack, and/or using another type of cellular air interface. Macro cell 130 and/or small cell 135 may each enable communication with core network 150 to enable core network 150 to authenticate UE device 110 with a subscriber management device (e.g., Home Subscriber Server (HSS) in 4G, Unified Data Management (UDM) in 5G, etc.).

Macro cell 130 may be associated with a cell tower or mast and may include a high-power RF transmitter that provides coverage to a large area in comparison to small cell 135. Small cell 135 may include a small cell, such as a microcell, picocell, femtocell, and/or another type of small cell that includes an RF transmitter with a lower power output than the RF transmitter associated with macro cell 130 and may provide coverage for a smaller area than the coverage area associated with macro cell 130. For example, in some situations, the coverage area of a particular small cell 135 may be entirely subsumed by the coverage area of a particular macro cell 130. A particular small cell 135 may corresponds to a closed access small cell that only allows a particular UE device 110 to attach if the particular UE device 110 is a member of the particular closed access small cell. Macro cell 130 may perform interference mitigation for UE device 110, if UE device 110 is within the coverage area of a closed access small cell and not a member of the closed access small cell, by instructing the UE device 110 to provide a measurement report for base stations operating on another channel or band and performing a handover for UE device 110 to a base station operating on the other channel or band if the UE device 110 detects at least one such base station.

MEC network 140 may be associated with one or more macro cells 130 and/or small cells 135 and may provide MEC services for UE devices 110 attached to the one or more macro cells 130 and/or small cells 135. MEC network 140 may be in proximity to the one or more macro cells 130 and/or small cells 135 from a geographic and network topology perspective, thus enabling low latency communication with UE devices 110 and/or macro cells 130 and/or small cells 135. As an example, MEC network 140 may be located on a same site as macro cell 130 and/or small cell 135. As another example, MEC network 140 may be geographically close to a macro cell 130 and/or small cell 135 and reachable via fewer network hops and/or fewer switches than other macro cells 130 and/or small cells 135. As yet another example, MEC network 140 may be reached without the data traffic having to go through a gateway device, such as a 4G Packet Data Network Gateway (PGW) or a 5G User Plane Function (UPF). MEC network 140 may include one or more MEC devices 145. MEC devices 145 may provide MEC services to UE devices 110, such as, for example, delivery of streaming audio and/or video, cloud computing services, gaming, authentication services, etc. Furthermore, in some implementations, MEC device 145 may host network functions (NFs) implementing part of all of the functionality of core network 150.

Core network 150 may be managed by a provider of cellular wireless communication services and may manage communication sessions of subscribers connecting to core network 150 via RAN 120. For example, core network 150 may establish an Internet Protocol (IP) connection between UE devices 110 and other networks, such as data network 170. In some implementations, core network 150 may include a 5G core network. In other implementations, core network 150 may include a 4G LTE core network (e.g., an evolved packet core (EPC) network). The components of core network 150 may include NFs. The NFs may be implemented as dedicated hardware components and/or as virtualized functions implemented on top of a common shared physical infrastructure using Software Defined Networking (SDN). For example, an SDN controller may implement the components of core network 150 using an adapter implementing a virtual network function (VNF) virtual machine, a Cloud Native Function (CNF) container, an event driven serverless architecture interface, and/or another type of SDN architecture. The common shared physical infrastructure may be implemented using one or more devices 200 described below with reference to FIG. 2 in a cloud center. Additionally, or alternatively, some, or all, of the common shared physical infrastructure may be implemented using one or more devices 200 implemented in MEC devices 145 in MEC network 140.

Data network 170 may include a packet data network. Data network 170 may be associated with an Access Point Name (APN) and UE device 110 may request a connection to data network 170 using the APN. Data network 170 may include, and/or be connected to and enable communication with a local area network (LAN), a wide area network (WAN), a metropolitan area network (MAN), an autonomous system (AS) on the Internet, an optical network, a cable television network, a satellite network, an ad hoc network, an intranet, or a combination of networks.

Although FIG. 1 shows exemplary components of environment 100, in other implementations, environment 100 may include fewer components, different components, differently arranged components, or additional components than depicted in FIG. 1. Additionally, or alternatively, one or more components of environment 100 may perform functions described as being performed by one or more other components of environment 100.

Figure 2:
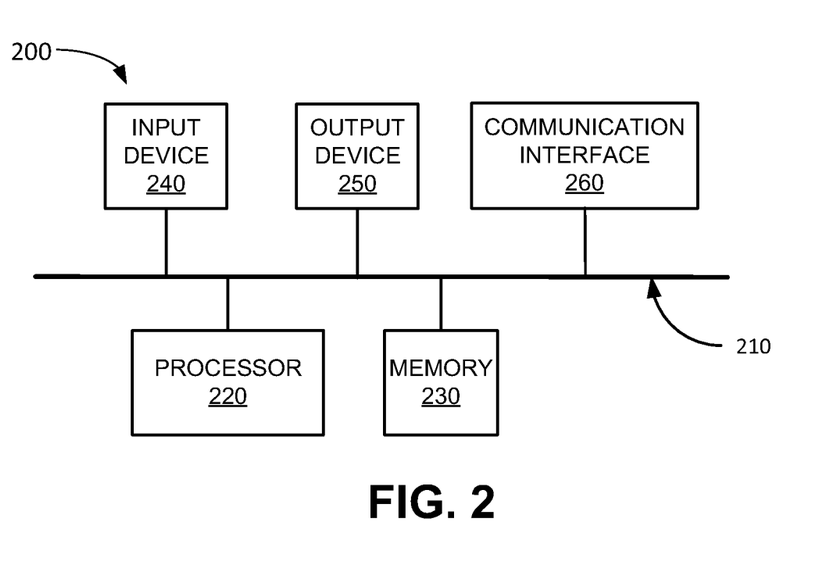
FIG. 2 is a diagram illustrating exemplary components of a device that may be included in a component of an environment according to an implementation described herein.

FIG. 2 illustrates example components of a device 200 according to an implementation described herein. UE device 110, macro cell 130, small cell 135, MEC device 145, and/or other components of environment 100, may each include one or more devices 200. As shown in FIG. 2, device 200 may include a bus 210, a processor 220, a memory 230, an input device 240, an output device 250, and a communication interface 260.

Bus 210 may include a path that permits communication among the components of device 200. Processor 220 may include any type of single-core processor, multi-core processor, microprocessor, latch-based processor, and/or processing logic (or families of processors, microprocessors, and/or processing logics) that interprets and executes instructions. In other embodiments, processor 220 may include an application-specific integrated circuit (ASIC), a field-programmable gate array (FPGA), and/or another type of integrated circuit or processing logic.

Memory 230 may include any type of dynamic storage device that may store information and/or instructions, for execution by processor 220, and/or any type of non-volatile storage device that may store information for use by processor 220. For example, memory 230 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 240 may allow an operator to input information into device 200. Input device 240 may include, for example, a keyboard, a mouse, a pen, a microphone, a remote control, an audio capture device, an image and/or video capture device, a touch-screen display, and/or another type of input device. In some embodiments, device 200 may be managed remotely and may not include input device 240. In other words, device 200 may be "headless" and may not include a keyboard, for example.

Output device 250 may output information to an operator of device 200. Output device 250 may include a display, a printer, a speaker, and/or another type of output device. For example, device 200 may include a display, which may include a liquid-crystal display (LCD) for displaying content to the customer. In some embodiments, device 200 may be managed remotely and may not include output device 250.

In other words, device 200 may be "headless" and may not include a display, for example.

Communication interface 260 may include a transceiver that enables device 200 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 260 may include a transmitter that converts baseband signals to radio frequency (RF) signals and/or a receiver that converts RF signals to baseband signals. Communication interface 260 may be coupled to one or more antennas/antenna arrays for transmitting and receiving RF signals.

Communication interface 260 may include a logical component that includes input and/or output ports, input and/or output systems, and/or other input and output components that facilitate the transmission of data to other devices. For example, communication interface 260 may include a network interface card (e.g., Ethernet card) for wired communications and/or a wireless network interface (e.g., a WiFi) card for wireless communications. Communication interface 260 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As will be described in detail below, device 200 may perform certain operations relating to interference mitigation for UE devices in the vicinity of a closed access small cell. Device 200 may perform these operations in response to processor 220 executing software instructions contained in a computer-readable medium, such as memory 230. A computer-readable medium may be defined as a non-transitory memory device. A memory device may be implemented within a single physical memory device or spread across multiple physical memory devices. The software instructions may be read into memory 230 from another computer-readable medium or from another device. The software instructions contained in memory 230 may cause processor 220 to perform processes described herein. Alternatively, hardwired circuitry may be used in place of, or in combination with, software instructions to implement processes described herein. Thus, implementations described herein are not limited to any specific combination of hardware circuitry and software.

Although FIG. 2 shows exemplary components of device 200, in other implementations, device 200 may include fewer components, different components, additional components, or differently arranged components than depicted in FIG. 2. Additionally, or alternatively, one or more components of device 200 may perform one or more tasks described as being performed by one or more other components of device 200.

Figure 3:
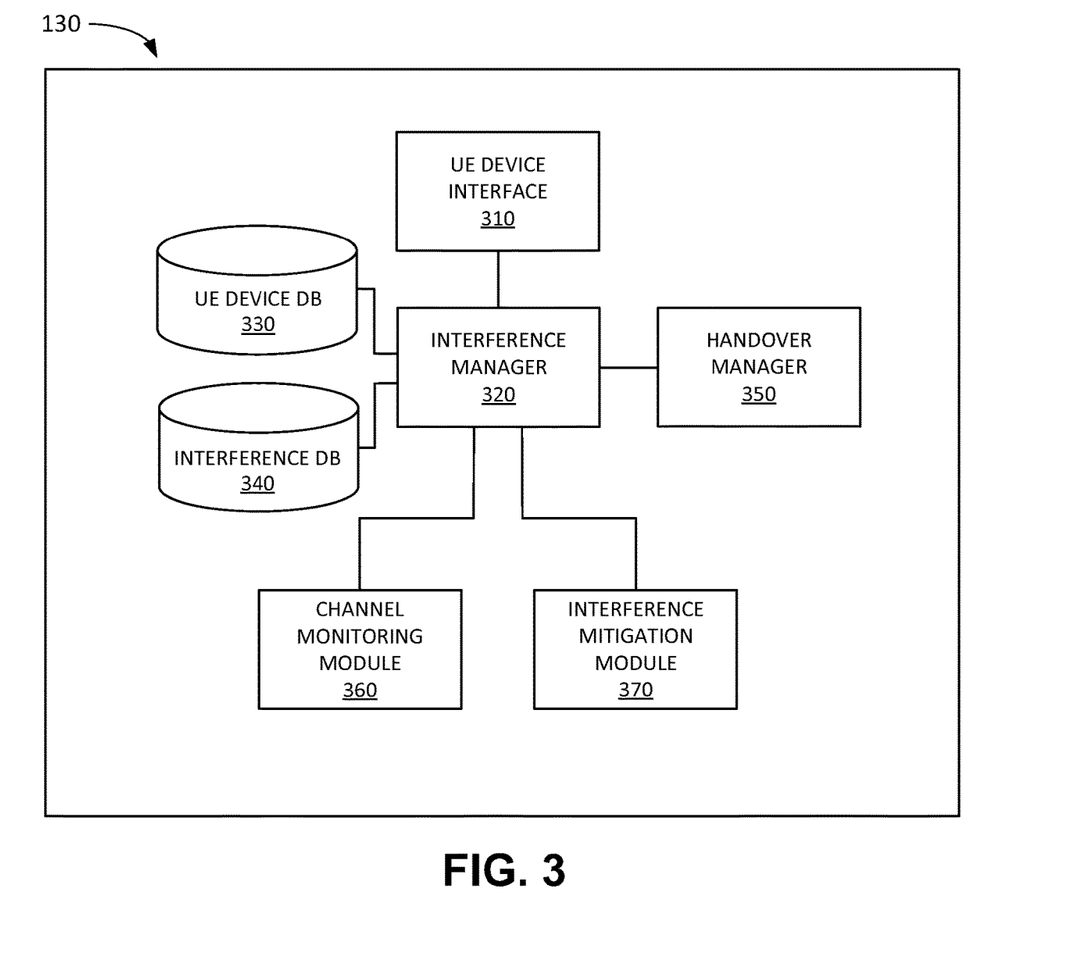
FIG. 3 is a diagram illustrating exemplary components of a base station according to an implementation described herein.

FIG. 3 is a diagram illustrating exemplary components of macro cell 130. The components of macro cell 130 may be implemented, for example, via processor 220 executing instructions from memory 230. Alternatively, some or all of the components of macro cell 130 may be implemented via hard-wired circuitry. As shown in FIG. 3, macro cell 130 may include a UE device interface 310, an interference manager 320, a UE device database (DB) 330, an interference DB 340, a handover manager 350, a channel monitoring module 360, and an interference mitigation module 370.

UE device interface 310 may be configured to communicate with UE devices 110. For example, UE device interface 310 may implement a 4G LTE air interface and/or a 5G NR air interface. Interference manager 320 may monitor and manage interference experienced by UE devices 110 attached to macro cell 130. For example, interference manager 320 may monitor the interference experienced by UE devices 110 attached to macro cell 30. If interference manager 320 receives a measurement report, from UE device 110, which indicates that UE device 110 is in the coverage area of a closed access small cell, and is not a member of the closed access small cell, and determines that, based on the measurement report, the UE device 110 is experiencing a greater level of interference than an interference threshold, interference manager 320 may instruct the UE device 110 to send a measurement report for any base stations operating on another channel or band that UE device 110 is able to detect. Interference manager 320 may then perform interference mitigation using channel monitoring module 360 and/or interference mitigation module 370.

UE device DB 330 may store information relating to measurement reports received from particular UE devices 110 attached to macro cell 130. Example information that may be stored in UE device DB 330 is described below with reference to FIG. 4. Interference DB 340 may store information relating to interference thresholds associated with macro cell 130. For example, interference DB 340 may store interference thresholds for particular measures of signal quality and/or signal strength, such as, for example, thresholds for RSRP, RSSI, RSRQ, SNR, SINR, and/or another type of KPI parameter.

Handover manager 350 may perform handovers to another base station. When macro cell 130 receives a measurement report from UE device 110 indicating that UE device 110 has detected another base station with a stronger signal, macro cell 130 may perform a handover of UE device 110 to the other base station. For example, if UE device 110 is a member of small cell 135 which is a closed access small cell, and UE device 110 enters the coverage area of small cell 35, handover manager 350 may perform a handover of UE device 110 from macro cell 130 to small cell 135.

Channel monitoring module 360 may monitor for base stations operating on other channels or bands. If UE device 110 provides a measurement report for base stations operating on another channel or band than the channel on which UE device 110 communicates with macro cell 130, channel monitoring module 360 may select a particular base station, from the base stations identified in the measurement report, for a handover. Interference mitigation module 370 may perform interference mitigation for UE device 110, if UE device 110 is experiencing a level of interference greater than an interference threshold, and if UE device 110 cannot be handed over to another base station to address the interference. For example, interference mitigation module 370 may coordinate an ICIC interference mitigation with UE device 110 and/or another base station (e.g., small cell 135).

Although FIG. 3 shows exemplary components of macro cell 130, in other implementations, macro cell 130 may include fewer components, different components, additional components, or differently arranged components than depicted in FIG. 3. Additionally, or alternatively, one or more components of macro cell 130 may perform one or more tasks described as being performed by one or more other components of macro cell 130.

Figure 4:
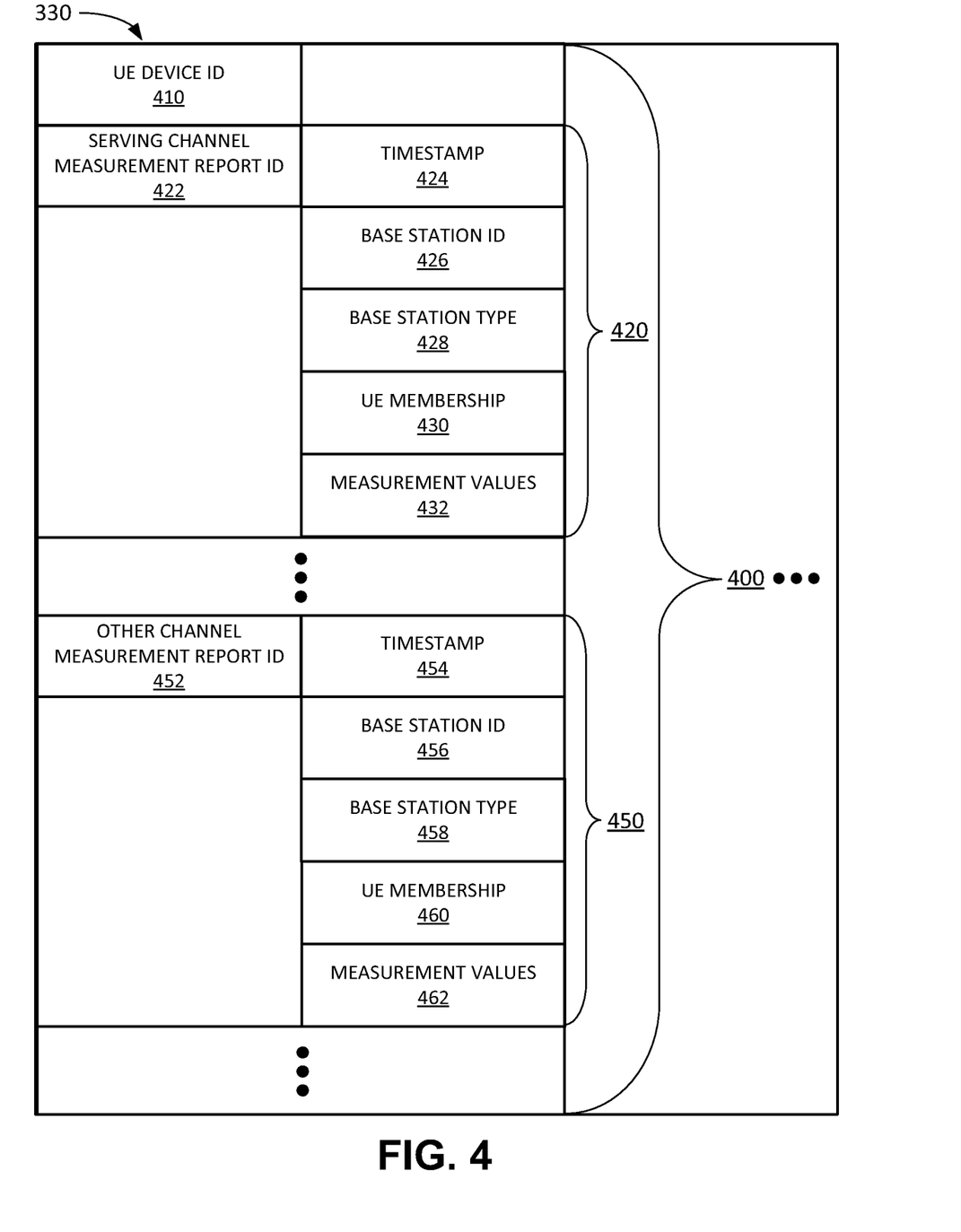
FIG. 4 is a diagram illustrating exemplary components of a user equipment (UE) device database according to an implementation described herein.

FIG. 4 is a diagram illustrating exemplary information stored in UE device DB 330. As shown in FIG. 4, UE device DB 330 may include one or more UE device records 400.

Each UE device record 400 may store measurement report information relating to a particular UE device 110. UE device record 400 may include a UE device ID field 410, one or more serving channel measurement reports 420, and one or more other channel measurements reports 450.

UE device ID field 410 may store an ID associated with a particular UE device 110. For example, UE device ID field 410 may store a Mobile Station International Subscriber Directory Number (MSISDN), a Mobile Directory Number (MDN), an International Mobile Subscriber Identity (IMSI), an International Mobile Equipment Identity (IMEI), an IP address, a Media Access Control (MAC) address, and/or another type of identifier associated with UE device 110.

Each serving channel measurement report 420 may store information relating to a measurement report received from the particular UE device 110 for the serving channel that the particular UE device 110 uses to communicate with macro cell 130. Serving channel measurement report 420 may include a serving channel measurement report ID field 422, a timestamp field 424, a base station ID field 426, a base station type field 428, a UE membership field 430, and a measurement values field 432.

Serving channel measurement report ID field 422 may store an ID associated with a particular serving channel measurement report. Additionally, serving channel measurement report ID field 422 may include an ID identifying a particular channel and/or band and may include other information associated with the particular channel and/or band, such as name and/or frequency for the channel, a name and/or frequency for a band associated with the channel, and/or other types information associated with the particular channel and/or band. Timestamp field 424 may include a timestamp identifying a time at which the measurement report was received.

Base station ID field 426 may include an ID associated with a particular base station detected by the particular UE device 110. Base station type field 428 may include information identifying a base station type associated with the particular base station. For example, the base station type may correspond to a size/transmission distance and identify the base station as a macro cell or a particular type of small cell (e.g., microcell, picocell, femtocell, etc.). Additionally, the base station type may identify whether the particular base station corresponds to an open access base station or a closed access base station. UE membership field 430 may store information identifying whether the particular UE device 110 is a member of the particular base station, if the particular base station is a closed access base station.

Each of other channel measurements reports 450 may store information relating to a measurement report received from the particular UE device 110 for channels and/or bands different from the serving channel that the particular UE device 110 uses to communicate with macro cell 130. For example, UE device 110 may provide a measurement report for base stations, which the UE device 110 is able to detect, operating on other channels or bands, in response to an instruction from macro cell 130 to provide such a measurement report.

Other channel measurements report 450 may include a other channel measurement report ID field 452, a timestamp field 454, a base station ID field 456, a base station type field 458, a UE membership field 460, and a measurement values field 462. Other channel measurement report ID field 452, a timestamp field 454, a base station ID field 456, a base station type field 458, a UE membership field 460, and a measurement values field 462 may store information similar to the information described above with respect to serving channel measurement report ID field 422, timestamp field 424, base station ID field 426, base station type field 428, UE membership field 430, and measurement values field 432, respectively.

Although FIG. 4 shows exemplary components of UE device DB 330, in other implementations, UE device DB 330 may include fewer components, different components, additional components, or differently arranged components than depicted in FIG. 4.

Figure 5:
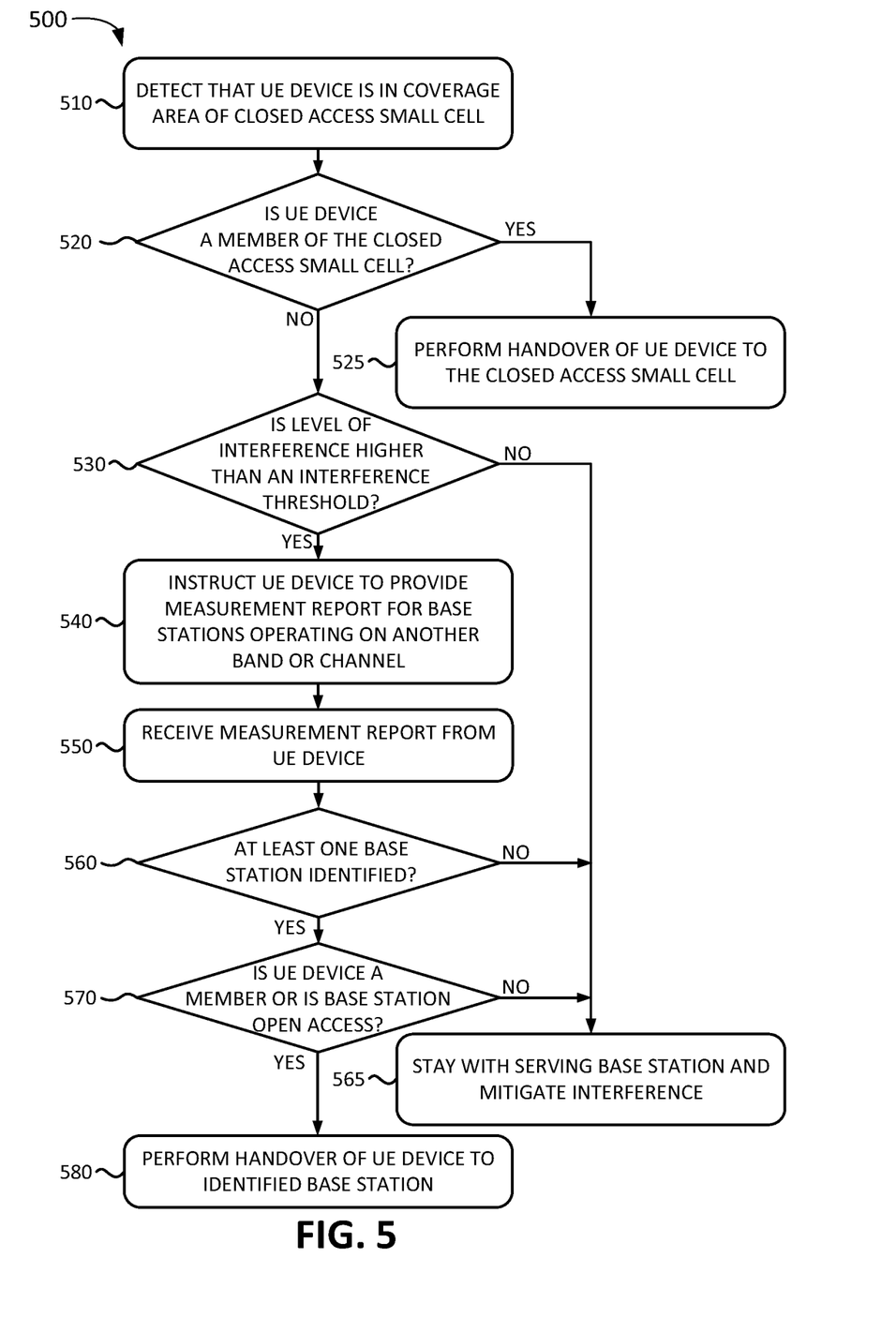
FIG. 5 illustrates a flowchart for performing interference mitigation according to an implementation described herein.

FIG. 5 illustrates a flowchart of a process 500 for performing interference mitigation according to an implementation described herein. In some implementations, process 500 of FIG. 5 may be performed by macro cell 130. In other implementations, some or all of process 500 may be performed by another device or a group of devices separate from macro cell 130.

As shown in FIG. 5, process 500 may include detecting that a UE device is in the coverage area of a closed access small cell (block 510). For example, macro cell 130 may receive a measurement report from UE device 110. The measurement report may include information identifying base stations detected by UE device 110. For each identified base station, the measurement report may include one or more signal quality and/or signal strength values measured by UE device 110 for the base station. The measurement report may identify a closed access small cell (e.g., small cell 135).

Process 500 may further include determining whether the UE device is a member of the closed access small cell (block 520). For example, macro cell 130 may determine whether the received measurement report indicates that UE device 110 is a member of the closed access small cell. If it is determined that the UE device is a member of the closed access small cell (block 520—YES), a handover process may be performed of the UE device to the closed access small cell (block 525). For example, macro cell 130 may determine that UE device 110 is experiencing better signal strength and/or quality from small cell 135 and may initiate a handover process with small cell 135 to handover UE device 110 to small cell 135.

If it is determined that the UE device is a not member of the closed access small cell (block 520—NO), a determination may be made as to whether the interference associated with the UE device is higher than an interference threshold (block 530). For example, macro cell 130 may compare the signal strength and/or quality measurement values in the received measurement report with the interference threshold values stored in interference DB 340 to determine that an interference threshold has been reached. As an example, in some implementations, a signal interference threshold may be set to less than or equal to 0 dB. If macro cell 130 determines that the interference experienced by UE device 110 does not exceed an interference threshold, macro cell 130 may determine that interference mitigation for UE device 110 need not be performed.

If it is determined that the interference associated with the UE device is not higher than an interference threshold (block 530—NO), a determination may be made to stay with the serving base station (block 565). Furthermore, in some implementations, mitigation interference may be performed even if the interference associated with the UE device is not higher than an interference threshold. For example, macro cell 130 may maintain the attachment of UE device 110 and may initiate mitigation interference by, for example, coordinating an ICIC interference mitigation with UE device 110 and/or the small access closed cell.

If it is determined that the interference associated with the UE device is higher than an interference threshold (block 530—YES), the UE device may be instructed to provide a measurement report for base stations operating on another channel or band (block 540). If macro cell 130 determines that the level of interference experienced by UE device 110 does exceed an interference threshold macro cell 130 may, in response, send an instruction to UE device 110 to provide one or more measurement reports for other channels or bands on which UE device 110 is able to operate. In response UE device 110 may generate one or more measurement reports for the other channels or bands and send the one or more measurement reports to macro cell 130.

Process 500 may further include receiving a measurement report from the UE device (block 550) and determining whether at least one base station has been identified (block 560). For example, macro cell 130 may determine whether a measurement report received from UE device 110 detected at least one base station operating on another channel or band than the channel via which UE device 110 is currently communicating.

If it is determined that no base stations operating on another channel or band has been identified by the UE device (block 560—NO), a determination may be made to stay with the serving base station and mitigate interference (block 565). For example, macro cell 130 may maintain the attachment of UE device 110 and may initiate mitigation interference by for example, coordinating an ICIC interference mitigation with UE device 110 and/or the small access closed cell.

If it is determined that at least one base station operating on another channel or band has been identified by the UE device (block 560—YES), a determination may be made as to whether the identified base station is an open access base station, or whether the UE device is a member of the identified base station if the identified base station is a closed access base station (block 570). For example, macro cell 130 may rank all the base stations detected by UE device 110 and operating on another channel or band based on signal strength and/or quality measured by UE device 110. Macro cell 130 may then filter the list by removing any closed access base stations, for which UE device 110 is not a member, from the list.

If it is determined that all the identified base stations operating on other channels or bands are closed access base stations and that the UE device is not a member of any of the identified base stations (block 570—NO), a determination may be made to stay with the serving base station and mitigate interference (block 565). For example, macro cell 130 may maintain the attachment of UE device 110 and may initiate mitigation interference by, for example, coordinating an ICIC interference mitigation with UE device 110 and/or the small access closed cell.

If it is determined that the identified base station is an open access base station or the UE device is a member of the identified base station if the identified base station is a closed access base station (block 570—YES), a handover process may be performed, to handover the UE device to the identified base station (block 580). For example, macro cell 130 may then select the highest ranked base station (e.g., the base station with the highest signal strength and/or quality) from the filtered list of base stations operating on another channel or band and initiate a handover process with the selected base station to handover UE device 110 to the selected base station.

Figure 6:
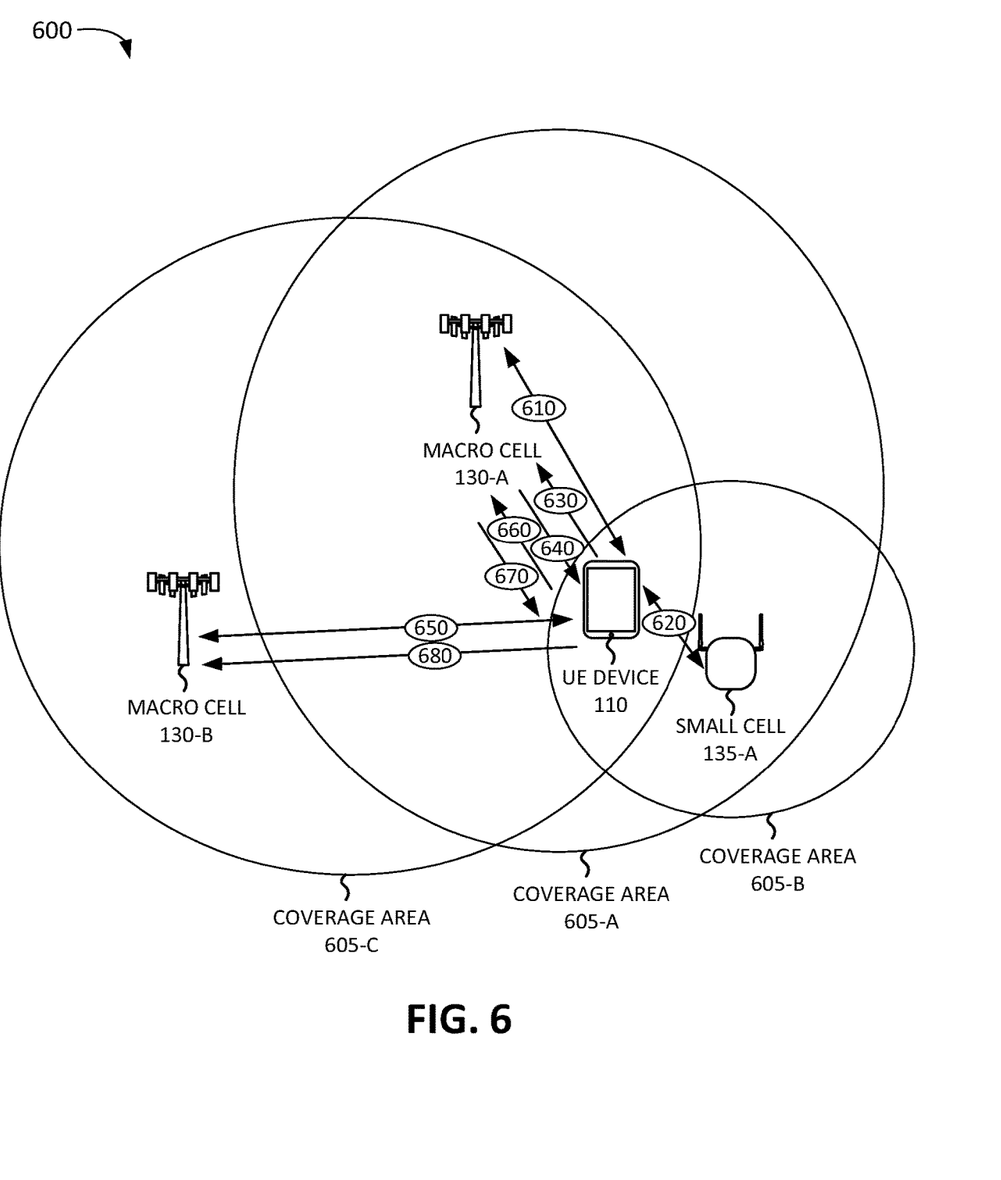
FIG. 6 is an exemplary signal flow diagram according to an implementation described herein.

FIG. 6 is a diagram of a signal flow 600 according to an implementation described herein. As shown in FIG. 6, signal flow 600 may include UE device 110, macro cell 130-A with coverage area 605-A, small cell 135-A with coverage area 605-B, and macro cell 130-B, with coverage area 605-C. Macro cell 130-B may operate on a different band or channel than macro cell 130-A and small cell 135-A. UE device 110 may be within coverage area 605-A and be attached to macro cell 130-A using a first channel F1 (signal 610).

UE device 110 may then enter coverage area 605-B of small cell 135-A and may detect the signals broadcast by small cell 135-A advertising its presence (signal 620). In response, UE device 110 may send a measurement report to macro cell 130-A (signal 630). The measurement report may include information identifying small cell 135-A, which may be a closed access small cell, and information indicating that UE device 110 is not a member of small cell 135-A.

Macro cell 130-A may determine that UE device 110 is experience a high level of interference (e.g., higher than a particular threshold configurable by an operator of RAN 120) from small cell 135-A and may, in response, instruct UE device 110 to send a measurement report for other channels or bands for which UE device 110 is configured (signal 640). In response, UE device 110 may scan the other channels or bands and may detect the presence of macro cell 130-B, operating on channel F2 (signal 650). UE device 110 may then send a measurement report to macro cell 130-A with information identifying macro cell 130-B operating on F2 (signal 660). In response, macro cell 130-A may initiate a handover to macro cell 130-B (signal 670) and UE device 110 may attach to macro cell 130-B using F2 (signal 680), resulting in a reduction of interference for UE device 110 without having to perform interference mitigation between UE device 110 and small cell 135-A.

Figure 7:
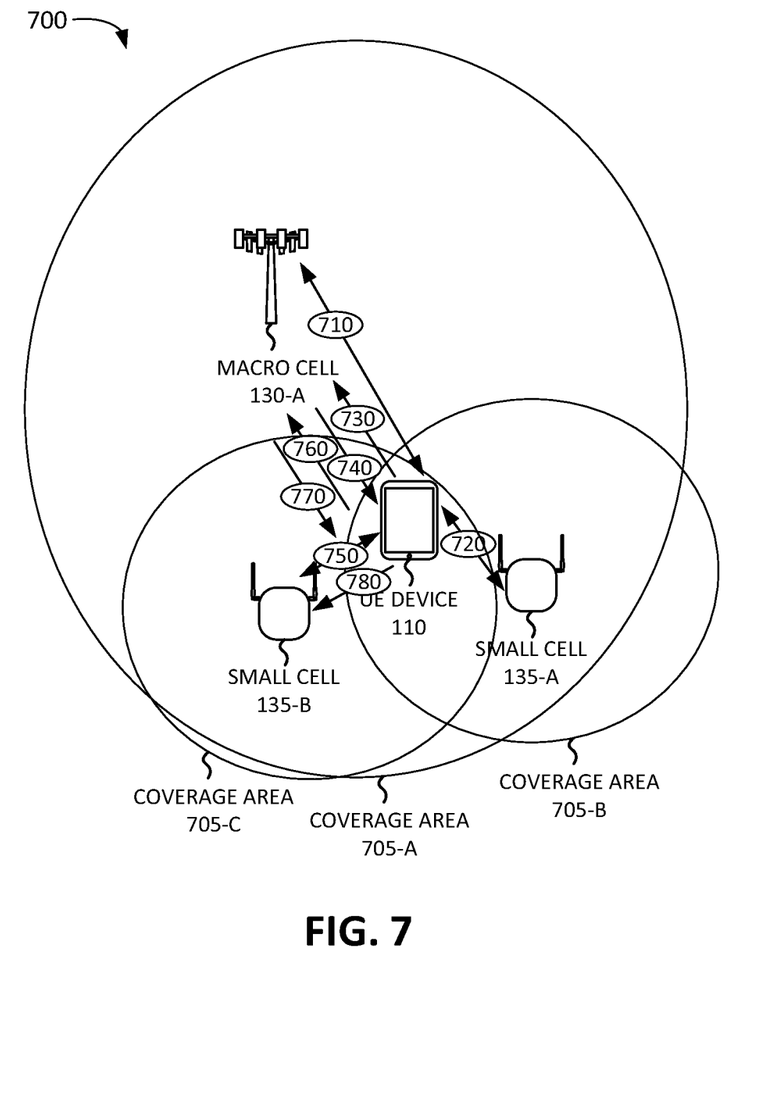
FIG. 7 is another exemplary signal flow diagram according to an implementation described herein.

FIG. 7 is a diagram of a signal flow 700 according to an implementation described herein. As shown in FIG. 7, signal flow 700 may include a scenario with multiple small cells 135, such as may occur for an apartment complex with many residents. Signal flow 700 may include UE device 110, macro cell 130-A with coverage area 705-A, small cell 135-A with coverage area 705-B, and small cell 135-B, with coverage area 705-C. Small cell 135-B may operate on a different band or channel than macro cell 130-A and small cell 135-A. UE device 110 may be within coverage area 705-A and be attached to macro cell 130-A using a first channel F1 (signal 710).

UE device 110 may then enter coverage area 705-B of small cell 135-A and may detect the signals broadcast by small cell 135-A advertising its presence (signal 720). In response, UE device 110 may send a measurement report to macro cell 130-A (signal 730). The measurement report may include information identifying small cell 135-A, which may be a closed access small cell, and information indicating that UE device 110 is not a member of small cell 135-A.

Macro cell 130-A may determine that UE device 110 is experience high level of interference (e.g., higher than a particular threshold) from small cell 135-A and may, in response, instruct UE device 110 to send a measurement report for other channels or bands for which UE device 110 is configured (signal 740). In response, UE device 110 may scan the other channels or bands and may detect the presence of small cell 135-B, operating on channel F2 (signal 750). UE device 110 may then send a measurement report to macro cell 130-A with information identifying small cell 135-B operating on F2 (signal 760). In response, macro cell 130-A may initiate a handover to small cell 135-B (signal 770), if small cell 135-B is an open access small cell or if UE device 110 is a member of small cell 135-B, and UE device 110 may attach to small cell 135-B using F2 (signal 780), resulting in a reduction of interference for UE device 110 without having to perform interference mitigation between UE device 110 and small cell 135-A.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of blocks have been described with respect to FIG. 5, and a series of signals with respect to FIGS. 6 and 7, the order of the blocks and/or signals may be modified in other implementations. Further, non-dependent blocks and/or signals may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/ "comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

To the extent the aforementioned embodiments collect, store, or employ personal information of individuals, it should be understood that such information shall be collected, stored, and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:
    determining by a base station, that a user equipment (UE) device, attached to the base station, is within a coverage area of a small cell, wherein the small cell is operating on a first channel;
    determining, by the base station, that the UE device is not a member of the small cell;
    determining, by the base station, that a level of interference experienced by the UE device on the first channel is higher than an interference threshold;
    sending, by the base station, an instruction to the UE device to provide measurement reports for base stations operating on other bands or channels, different from the first channel, on which the UE device is able to operate, in response to determining that the UE device is not a member of the small cell and determining that the level of interference experienced by the UE device on the first channel is higher than the interference threshold;
    receiving, by the base station, a measurement report from the UE device that identifies one or more neighboring base stations operating on the other band or channel; and
    performing, by the base station, a handover of the UE device to a neighboring base station, of the one or more neighboring base stations, wherein the UE device is to communicate with the neighboring base station using the other band or channel.

2. The method of claim 1, wherein determining that the UE device is not a member of the small cell includes:
    receiving a measurement report from the UE device, wherein the measurement report includes information indicating the membership status of the UE device with respect to the small cell.

3. The method of claim 1, wherein determining that the level of interference experienced by the UE device on the first channel is higher than the interference threshold includes:
    receiving a measurement report from the UE device, wherein the measurement report includes a signal strength or quality value reported by the UE device.

4. The method of claim 3, wherein the signal strength or quality value includes at least one of:
    a Reference Signal Received Power (RSRP) value,
    a Receive Strength Signal Indicator (RSSI) value,
    a Reference Signal Received Quality (RSRQ) value,
    a Signal to Noise Ratio (SNR) value, or
    a Signal to Interference Plus Noise Ratio (SINR) value.

5. The method of claim 1, further comprising:
    receiving another measurement report from another UE device attached to the base station, wherein the other UE device is within the coverage area of the small cell;
    determining that the other UE device is a member of the small cell, based on the received other measurement report; and performing a handover of the other UE device from the base station to the small cell, in response to determining that the other UE device is a member of the small cell.

6. The method of claim 1, wherein performing the handover of the UE device to the neighboring base station includes:
   determining that the neighboring base station is an open access base station or that the UE device is a member of the neighboring base station; and
   performing the handover of the UE device to the neighboring base station in response to determining that the neighboring base station is an open access base station or that the UE device is a member of the neighboring base station.

7. The method of claim 1, further comprising:
   receiving another measurement report from another UE device attached to the base station, wherein the other UE device is within the coverage area of the small cell;
   determining that the other UE device did not detect a neighboring base station operating on another band or channel based on the received other measurement report;
   maintaining an attachment of the other UE device to the base station, in response to determining that the other UE device did not detect a neighboring base station operating on another band or channel; and
   performing interference mitigation for the other UE device.

8. The method of claim 1, further comprising:
   receiving another measurement report from another UE device attached to the base station, wherein the other UE device is within the coverage area of the small cell;
   determining that all neighboring base stations operating on another band or channel identified by the other UE device correspond to closed access base stations;
   maintaining an attachment of the other UE device to the base station, in response to determining that all the neighboring base stations operating on another band or channel identified by the other UE device correspond to closed access base stations; and
   performing interference mitigation for the other UE device.

9. The method of claim 1, wherein the base station corresponds to a Fourth Generation (4G) base station.

10. The method of claim 1, wherein the base station corresponds to a Fifth Generation (5G) base station.

11. A device comprising:
   a processor configured to:
      determine that a user equipment (UE) device, attached to a base station, is within a coverage area of a small cell, wherein the small cell is operating on a first channel;
      determine that the UE device is not a member of the small cell;
      determine that a level of interference experienced by the UE device on the first channel is higher than an interference threshold;
      send an instruction to the UE device to provide measurement reports for base stations operating on other bands or channels, different from the first channel, on which the UE device is able to operate, in response to determining that the UE device is not a member of the small cell and determining that the level of interference experienced by the UE device on the first channel is higher than the interference threshold;
      receive a measurement report from the UE device that identifies one or more neighboring base stations operating on the other band or channel; and
      perform a handover of the UE device to a neighboring base station, of the one or more neighboring base stations, wherein the UE device is to communicate with the at least one neighboring base station using the other band or channel.

12. The device of claim 11, wherein, when determining that the UE device is not a member of the small cell, the processor is further configured to:
   receive a measurement report from the UE device, wherein the measurement report includes information indicating the membership status of the UE device with respect to the small cell.

13. The device of claim 11, wherein, when determining that the level of interference experienced by the UE device on the first channel is higher than the interference threshold, the processor is further configured to:
   receive a measurement report from the UE device, wherein the measurement report includes a signal strength or quality value reported by the UE device.

14. The device of claim 13, wherein the signal strength or quality value includes at least one of:
   a Reference Signal Received Power (RSRP) value,
   a Receive Strength Signal Indicator (RSSI) value,
   a Reference Signal Received Quality (RSRQ) value, or
   a Signal to Noise Ratio (SNR) value.

15. The device of claim 11, wherein the processor is further configured to:
   receive another measurement report from another UE device attached to the base station, wherein the other UE device is within the coverage area of the small cell;
   determine that the other UE device is a member of the small cell, based on the received other measurement report; and
   perform a handover of the other UE device from the base station to the small cell, in response to determining that the other UE device is a member of the small cell.

16. The device of claim 11, wherein the processor is further configured to:
   receive another measurement report from another UE device attached to the base station, wherein the other UE device is within the coverage area of the small cell;
   determine that the other UE device did not detect a neighboring base station operating on another band or channel based on the received other measurement report; and
   maintain an attachment of the other UE device to the base station, in response to determining that the other UE device did not detect a neighboring base station operating on another band or channel; and
   perform interference mitigation for the other UE device.

17. The device of claim 11, wherein when performing the handover of the UE device to the neighboring base station, the processor is further configured to:
   determine that the neighboring base station is an open access base station or that the UE device is a member of the neighboring base station; and
   perform the handover of the UE device to the neighboring base station in response to determining that the neighboring base station is an open access base station or that the UE device is a member of the neighboring base station.

18. The device of claim 11, wherein the processor is further configured to:

receive another measurement report from another UE device attached to the base station, wherein the other UE device is within the coverage area of the small cell;

determine that all neighboring base stations operating on another band or channel identified by the other UE device correspond to closed access base stations;

maintain an attachment of the other UE device to the base station, in response to determining that all the neighboring base stations operating on another band or channel identified by the other UE device correspond to closed access base stations; and perform interference mitigation for the other UE device.

19. A non-transitory computer-readable memory device storing instructions executable one a processor, the non-transitory computer-readable memory device comprising:

one or more instructions to determine that a user equipment (UE) device, attached to a base station, is within a coverage area of a small cell, wherein the small cell is operating on a first channel;

one or more instructions to determine that the UE device is not a member of the small cell;

one or more instructions to determine that a level of interference experienced by the UE device on the first channel is higher than an interference threshold;

one or more instructions to send an instruction to the UE device to provide measurement reports for base stations operating on other bands or channels, different from the first channel, on which the UE device is able to operate, in response to determining that the UE device is not a member of the small cell and determining that the level of interference experienced by the UE device operating on the first channel is higher than the interference threshold;

one or more instructions to receive a measurement report from the UE device that identifies one or more neighboring base stations operating on the other band or channel; and one or more instructions to perform a handover of the UE device to a neighboring base station, of the one or more neighboring base stations, wherein the UE device is to communicate with the at least one neighboring base station using the other band or channel.

20. The non-transitory computer-readable memory device of claim 19, further comprising:

one or more instructions to receive a measurement report from the UE device for the first channel, wherein the measurement report includes information indicating the membership status of the UE device with respect to the small cell and information indicating a signal strength or quality value reported by the UE device with respect to the first channel.

* * * * *